United States Patent
Chang et al.

(10) Patent No.: US 11,321,938 B2
(45) Date of Patent: May 3, 2022

(54) COLOR ADAPTATION USING ADVERSARIAL TRAINING NETWORKS

(71) Applicant: Siemens Aktiengesellschaft, Munich (DE)

(72) Inventors: Ti-chiun Chang, Princeton Junction, NJ (US); Jan Ernst, Princeton, NJ (US); Patrick Reeb, Adelsdorf (DE); Joachim Bamberger, Stockdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/769,674

(22) PCT Filed: Dec. 21, 2017

(86) PCT No.: PCT/US2017/067772
§ 371 (c)(1),
(2) Date: Jun. 4, 2020

(87) PCT Pub. No.: WO2019/125454
PCT Pub. Date: Jun. 27, 2019

(65) Prior Publication Data
US 2020/0372282 A1    Nov. 26, 2020

(51) Int. Cl.
*G06K 9/46* (2006.01)
*G06V 10/56* (2022.01)
(Continued)

(52) U.S. Cl.
CPC .......... *G06V 10/56* (2022.01); *G06N 3/084* (2013.01); *G06T 7/11* (2017.01); *G06T 7/90* (2017.01)

(58) Field of Classification Search
CPC ....... H04N 19/00024; H04N 19/00139; H04N 19/00315; H04N 19/00448; H04N 1/40012; H04N 1/40018; H04N 1/40025; H04N 1/40031; H04N 1/40037; H04N 1/40043; H04N 1/4005; H04N 1/40056; H04N 1/40062; H04N 1/40068; H04N 1/40075; H04N 1/46; H04N 1/54; H04N 1/56; H04N 1/60; H04N 1/6025; G06T 15/205; G06T 7/90; G06T 2207/20081;
(Continued)

(56) References Cited

U.S. PATENT DOCUMENTS

| 2013/0258068 A1 | 10/2013 | Schmidt et al. |
| 2015/0301226 A1 | 10/2015 | Sun et al. |
| 2019/0080206 A1* | 3/2019 | Hotson ............... G06K 9/00798 |

OTHER PUBLICATIONS

Zhang et al. ("Unsupervised Images Generation Based on Sloan Digital Sky Survey with Deep Convolutional Generative Neural Networks", IEEE, 2018 10th International Conference on Advanced Infocomm Technology, pp. 167-173) (Year: 2018).*

(Continued)

*Primary Examiner* — Duy M Dang (57) ABSTRACT

Systems and methods are provided for adapting images from different cameras so that a single trained classifier or an analyzer may be used. The classifier or analyzer operates on images that include a particular color distribution or characteristic. A generative network is used to adapt images from other cameras to have a similar color distribution or characteristic for use by the classifier or analyzer. A generative adversarial process is used to train the generative network.

13 Claims, 7 Drawing Sheets

(51) Int. Cl.
*G06T 7/11* (2017.01)
*G06T 7/90* (2017.01)
*G06N 3/08* (2006.01)

(58) Field of Classification Search
CPC . G06T 2207/20084; G06T 2207/10024; G06T 7/11; G06N 3/02; G06N 3/04; G06N 3/084; G06N 3/0472; G06N 3/0454; G06K 9/4652; G06K 9/6273; G06K 9/00624

See application file for complete search history.

(56) References Cited

OTHER PUBLICATIONS

Creswell, Antonia, et al. "Generative Adversarial Networks: An Overview." arXiv preprint arXiv:1710.07035 (2017).

Li, Jie, et al. "WaterGAN: Unsupervised Generative Network to Enable Real-time Color Correction of Monocular Underwater Images." arXiv preprint arXiv:1702.07392 (2017).

Magnone, Lydie, et al. "Cloud Motion Identification Algorithms Based on All-Sky Images to Support Solar Irradiance Forecast."

Wei Xiong et al: "Learning to Generate Time-Lapse Videos Using Multi-Stage Dynamic Generative Adversarial Networks", Arxiv. Org, Cornell University Library, 201 Olin Library Cornell University Ithaca, NY 14853, Sep. 22, 2017 (Sep. 22, 2017), XP080822616 / Sep. 22, 2017.

Yun Cao et al: "Unsupervised Diverse Colorization via Generative Adversarial Networks", Arxiv.org, Cornell University Library, 201 Olin Library Cornell University Ithaca, NY 14853, Feb. 22, 2017 (Feb. 22, 2017), XP080748044 / Feb. 22, 2017.

International Search Report dated Sep. 6, 2018; International Application No. PCT/US2017/067772; 13 pages.

* cited by examiner

COLOR ADAPTATION USING ADVERSARIAL TRAINING NETWORKS

CROSS REFERENCE TO RELATED APPLICATIONS

This application is a national phase filing under 35 U.S.C. § 371 of International Patent Application No. PCT/US2017/067772, filed Dec. 21, 2017, which is incorporated herein by reference in its entirety.

FIELD

The present embodiments relate to image processing, such as image processing for segmenting clouds in sky images.

BACKGROUND

When analyzing an image, the camera or device that captured the image may affect the analysis. Different cameras and camera manufacturers, for example, may include different structures, different lenses, different sensors, different processing of the data inside the body, different methodologies on how to handle color balance, white balance, exposure, shadows, contract, sharpness, highlights, among others.

For many applications, working with multiple cameras is not an unusual practice. Different types of cameras may be used in different locations. Cameras may be replaced over time with new models. Cameras may fail and be repaired using different parts. A user may have a favorite camera that produces images or photos that have the preferred color balance. When the favorite camera is not available (out of order, too bulky to carry, discontinued, etc.), a replacement camera may not provide similar analysis results due to differences in the color balance.

In order to provide an accurate analysis of images from different cameras, the images and image parameters (e.g. color balance, white balance, exposure, shadows, contract, sharpness, and/or highlights) need to be calibrated or adapted, which is very time-consuming and involves manually annotating each image so that the color balance is similar.

One technique for color adaptation is referred to as histogram specification. Histograms are generated for each camera and compared against one another. However, in order to establish histograms for both of the cameras, a multitude of images are collected from both cameras. In addition, because the images are not paired (e.g. taken at the same time of the same content, under the same circumstances), the mapping from one camera to the other may not be useful. For example, because the content of the images may be very different, the resulting color histograms may be wildly different and not useful. Alternatively, a partial solution is to perform white balance correction. The white balance correction approach attempts to maintain the whiteness (or grayness) for any white (gray) object. The white balance correction may be useful for black and white images, but fails to maintain the color similarity between the two cameras.

SUMMARY

By way of introduction, the preferred embodiments described below include methods and systems for adapting images from different cameras. A classifier or other computer-based analyzer may work with images from a given source or camera. In order to alter images from a different camera or source to more closely resemble the images from the given source or camera, a generative (neural) network is used. The generative network trained to synthesize images that include color features that are similar to color features from images that are used to train the classifier or on which the analyzer operates.

In a first aspect, a method is provided for adapting a second sky image from a second camera to be classified with a classifier trained on a plurality of first sky images from a first camera. The second sky image are acquired from the second camera. A third sky image is synthesized from the second sky image, using a generative network having been trained with generative adversarial training. The third sky image includes one or more color features that are similar to one or more color features of the plurality of first sky images. One or more clouds are detected in the third sky image using the classifier.

In a second aspect, a method is provided for training a generative network. A first plurality of images is acquired from a first device. A second plurality of images is acquired form a second device. A third image is synthesized by a generative network from a second image of the second plurality of images. A discriminative network determines how likely the synthesized third image was acquired by the second device or how likely the synthesized third image was synthesized using the generative network. The generative network is adjusted as a function of the determination.

In a third aspect, a system is provided for adapting sky images. The system includes a first camera, a second camera, a machine learnt generative network, and a cloud forecaster. The first camera is configured to acquire first sky images. The second camera is configured to acquire second sky images. The machine learnt generative network is configured to generate synthesized images from the second sky images. The synthesized images include different color features than the second sky images. The cloud forecaster is configured to identify clouds in the synthesized images, the cloud forecaster further configured to predict cloud coverage for a location.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION

An adversarial training approach is used to adapt images from different cameras so that a single trained classifier or an analyzer may be used. The classifier or analyzer operates on images that include a particular color distribution or characteristic. A generative network is used to adapt images from other cameras to have a similar color distribution or characteristic for use by the classifier or analyzer.

The adaptation may have many uses. For example, the adaptation alters the color in images of cloud cover from different cameras. A classifier trained on images from a given camera may classify the extent or type of cloud coverage based on images from other cameras synthesized and output by the generative network. The examples herein relate to use of images of cloud coverage for controlling energy supply or distribution. In other examples, images for film making, photography, scientific studies, and/or any analysis of views taken over periods of time or in different locations may be adapted so that a single trained classifier or analysis may be performed.

One major problem for industries, such as solar power generation, is that output may vary depending on the cloud coverage. Demand, however, may not decline when a solar plant doesn't produce energy. Another source of power may be put online to cover the shortfall. Utilities keep coal and natural-gas power plants running, ready to pitch in when solar is unable to hand the load. Having the power plants online and on-call burns more fuel and costs more money. Accurate prediction of cloud coverage is key to lowering costs of solar power generation.

Figure 1:
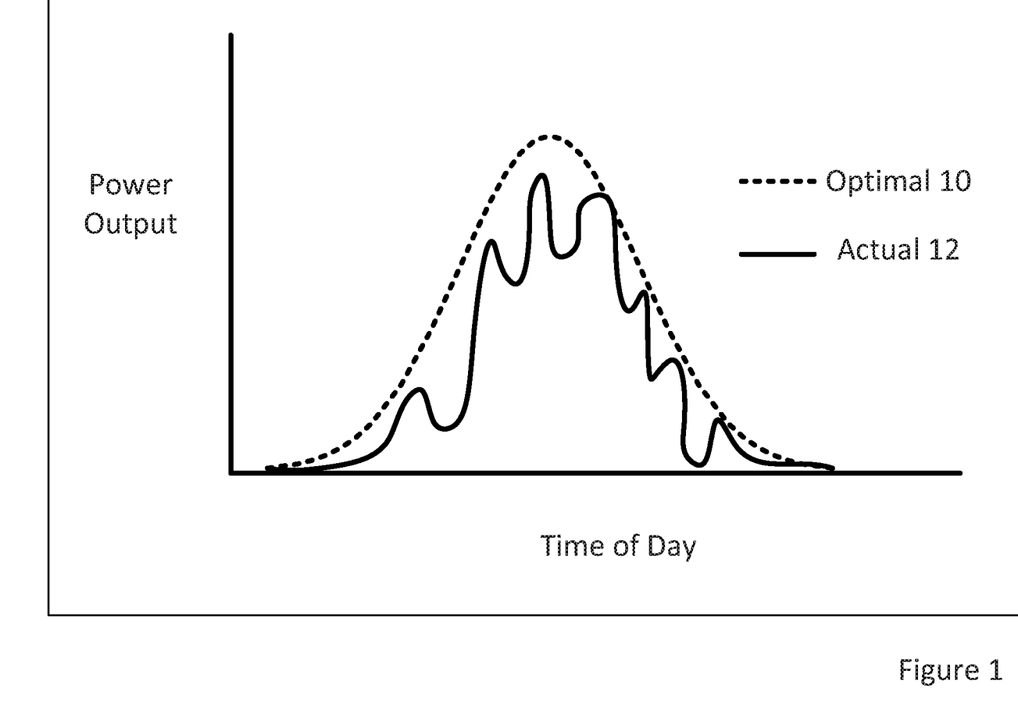
FIG. 1 depicts an example of power output over time for an example solar plant.

FIG. 1 depicts an example of power output over time for an example solar plant. The curve optimal curve 10 depicts an expected power output for 100% clear skies. With no cloud coverage, the power output is easy to predict. However, due to cloud coverage, the actual power output curve 12 is no longer smooth. The actual power output curve 12 dips and rises at unexpected intervals over the course of the day. At times, the actual power output 12 may be 50% or less of the optimal output 10 for clear skies. To complicate predicting power output, the cloud coverage changes from day-to-day, hour-to-hour, and even minute-to-minute, resulting in variable solar irradiance and variable power output.

Figure 2:
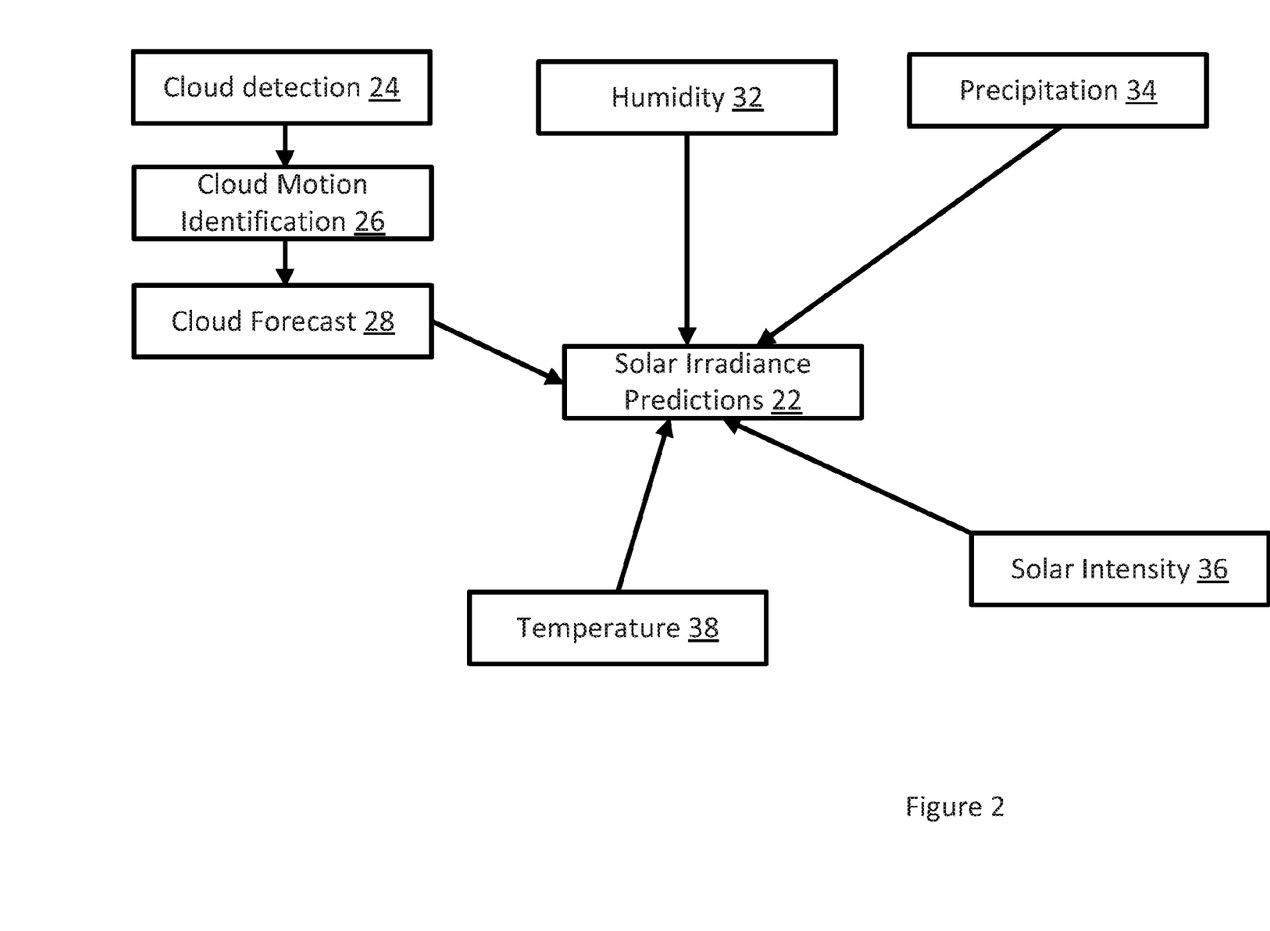
FIG. 2 depicts an example diagram for predicting solar irradiance.

FIG. 2 depicts an example diagram for predicting solar irradiance 22. Solar irradiance 22 (e.g. the potential solar energy for a solar plant or panel) may depend on multiple inputs such as time of day, weather, or location. Constructing a solar forecast requires weather data that includes parameters such as humidity 32, precipitation 34, maximum temperature 38, solar intensity 36, air pressure, downward/upward short-wave radiative flux, among others. These parameters may be used as training features where the solar irradiance prediction 22 is provided by a machine-learnt classifier. The weather parameters may be used in conjunction with photovoltaic performance simulation to convert harvested solar irradiance to solar power. Cloud formation and cloud coverage forecasts may be generated using satellite images and ground based imaging. The accuracy of the input image data is key to generating an accurate prediction. As depicted in FIG. 1, the amount of cloud coverage may drastically reduce the power output for a solar plant. In addition, cloud coverage may vary drastically over a short period of time as opposed to the other possible inputs such as temperature 38, solar intensity 36, precipitation 34, humidity 32, etc. that may change more slowly and are more predictable.

For cloud forecasting 28, the clouds are detected 34 by acquiring a series of images of a region of the sky with the help of image optical flow estimation. The motion 26 of the clouds is then estimated. Each pixel of the image is labeled as a cloud or clear sky. The result of the segmentation is a binary image. The combination of the cloud image 24 and motion prediction 26 is a cloud forecast 28. The cloud forecast 28 may be used to predict solar irradiance for both the present and future time periods. Cloud detection 24 is important in providing accurate information for an accurate prediction.

In an embodiment, multiple cameras are used to monitor the sky near locations of interest (e.g., near a hybrid power plant) and analyze the acquired images for short term cloud coverage. For analysis of the images, an image classifier may be used with pixel segmentation to identify the clouds in the image of the sky. For pixel segmentation, the basic features for the image classifier are pixel colors. When a different camera is used, the color features, such as pixel colors and the ratio among them, may be different to the extent that the already trained classifier may not perform optimally. Retraining the classifier is inefficient and may generate inaccurate results. For adapting a new set of sky images to be classified by a classifier trained on an old and different set of images, an embodiment uses adversarial training to identify mapping between the different color features of the different colors. A single classifier for segmentation and identification of clouds may be used with any of multiple cameras and maintain an accurate output even if a different camera is used to train the classifier.

For the adversarial training approach, a generative network and a discriminative network are provided. The generative network is trained to capture the features of images in one domain A and transform the images from domain A into those that are indistinguishable from those in domain B. The color characteristic or characteristics of images from one or more cameras are transformed to be similar or the same as the color characteristic or characteristics of images from a given camera. In the training process, the discriminative network plays the role of a judge to score how likely the transformed images from domain A are to those in domain B. The amount of data required to establish a reliable mapping between the two domains is much less than conventional methods (e.g. histogram specification) and the images are not required to be paired. Techniques that use paired images require that the two different cameras be in the same place at the same time and be able to capture similar images with similar content. For many applications, the pairing requirement is unwieldly if not impossible.

Figure 3:
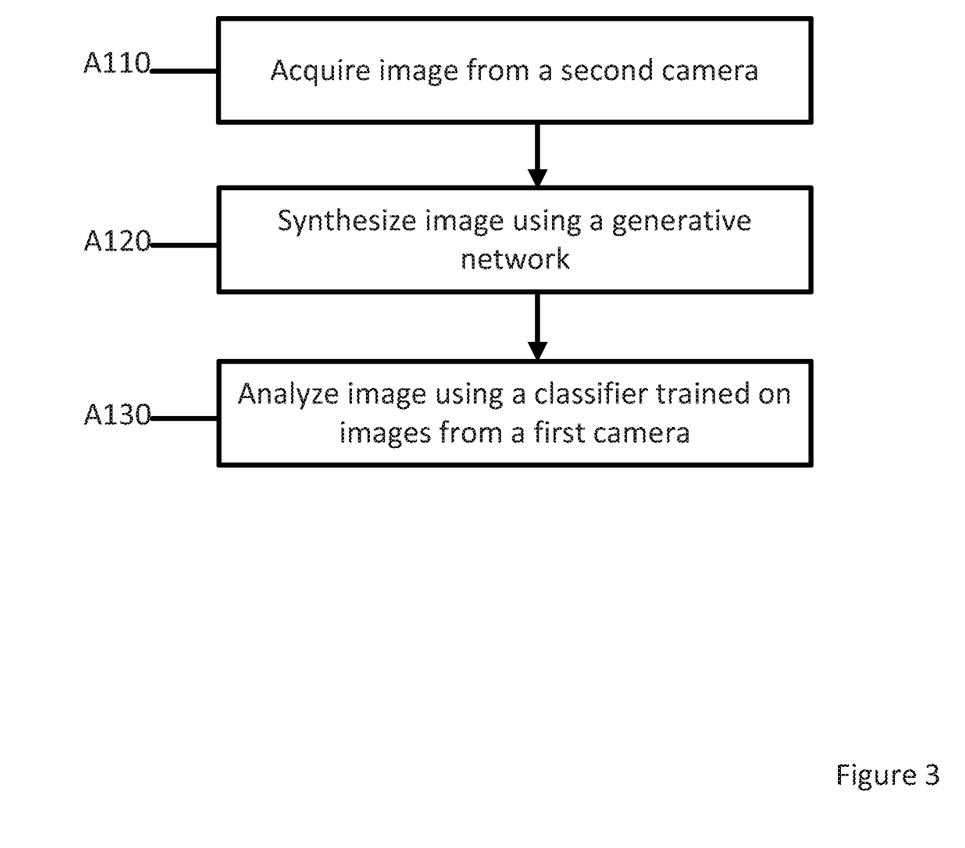
FIG. 3 depicts an example method for adapting a sky image from one camera to be analyzed with a classifier trained on sky images from a second camera.

FIG. 3 depicts an example method for adapting an image from one camera to be analyzed with a classifier trained on images from another camera. The acts are performed by the system of FIG. 7 other systems, a workstation, a computer, and/or a server. Additional, different, or fewer acts may be provided. The acts are performed in the order shown (e.g., top to bottom) or other orders.

At act A110, a second sky image is acquired from a second camera. The second sky image is not paired with any images from the first camera. Paired images are images that are taken from two sources (e.g. the first camera and second camera) at the same time of the same content. As the two paired images are capturing the same scene at the same time under the same conditions, the paired images may be identical or close to identical. If there are any differences, such as in color balance, the images may be easily corrected with simple matching between pixels as there is a one or one relationship. Unpaired images, however, are unable to be easily matched as the content of the images is different, preventing a one-to-one relationship between pixels.

The first camera and second camera may be different models, manufactured by different manufacturers, and/or have different output color features. In an example, the second camera may be a replacement camera that is a newer model of the camera that is replaced. The first camera or even a third camera not used of the facility may be the camera that the classifier has been trained on. For initial training of the classifier, many images are used to provide for accurate analysis of the cloud coverage. Repeating the collection and training for each new camera added to the system may be inefficient. The second sky image may be a color image. The second sky image may include a plurality of pixels, each of which include data that describes a color or feature of the pixel.

At act A120, a third sky image is synthesized using a trained generative network. The trained generative network is trained to adapt color features of an input image so that the outputted synthetic image includes similar color features from that of an image acquired by the first camera. In an embodiment, the third sky image may be preprocessed. Different cameras may have different base settings. For example, one camera may acquire images that are brighter than another camera. The generative network may adjust the brightness setting pixel-by-pixel (or group of pixels by pixels). Alternatively, an image processor processes the entire image as a whole prior to the generative network adjusting individual pixels or regions. Preprocessing of the image may include applying filters across the entire image to attempt to match image settings (or camera settings) from the target camera. The filters may include brightness, contrast, and color balance among other filters.

Figure 4A:
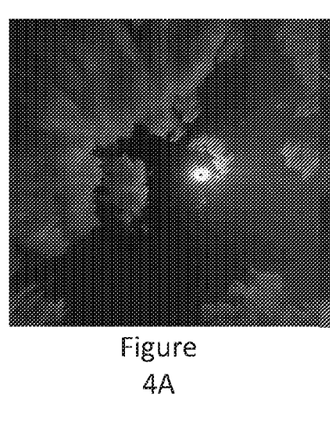
FIGS. 4A-4D depict example results of color adaptation from one camera to a second camera.
Figure 4B:
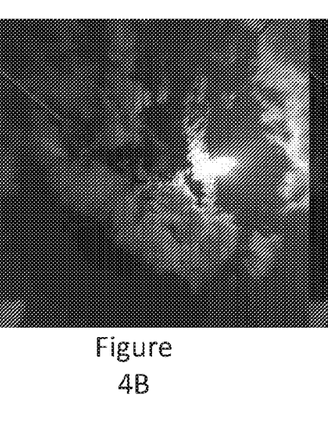
Figure 4C:
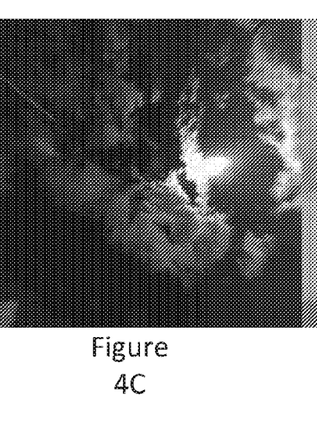
Figure 4D:
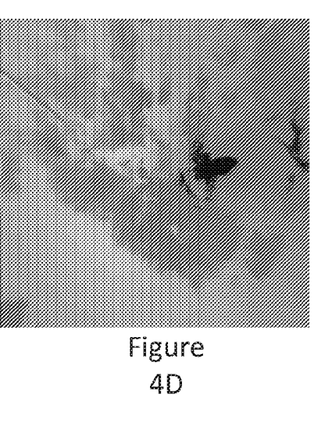

FIGS. 4A-4D depict example results of color adaptation from one camera to the other. FIG. 4A depicts an image from the first camera. FIG. 4B depicts an image from the second camera. FIG. 4C depicts a synthesized image produced by the generative network so that the color features are close to that of the image of FIG. 4A while maintaining the content or cloud structure. FIG. 4D depicts the difference between the image of 4B and the synthesized image of FIG. 4C. This difference represents changes made by the generative network.

The generative network may be trained using a generative adversarial network (GAN) training process to synthesize of sky images from the second sky images acquired by the second camera. The synthesized sky images include one or more color features that are similar to one or more color features of the first sky images.

Figure 5:
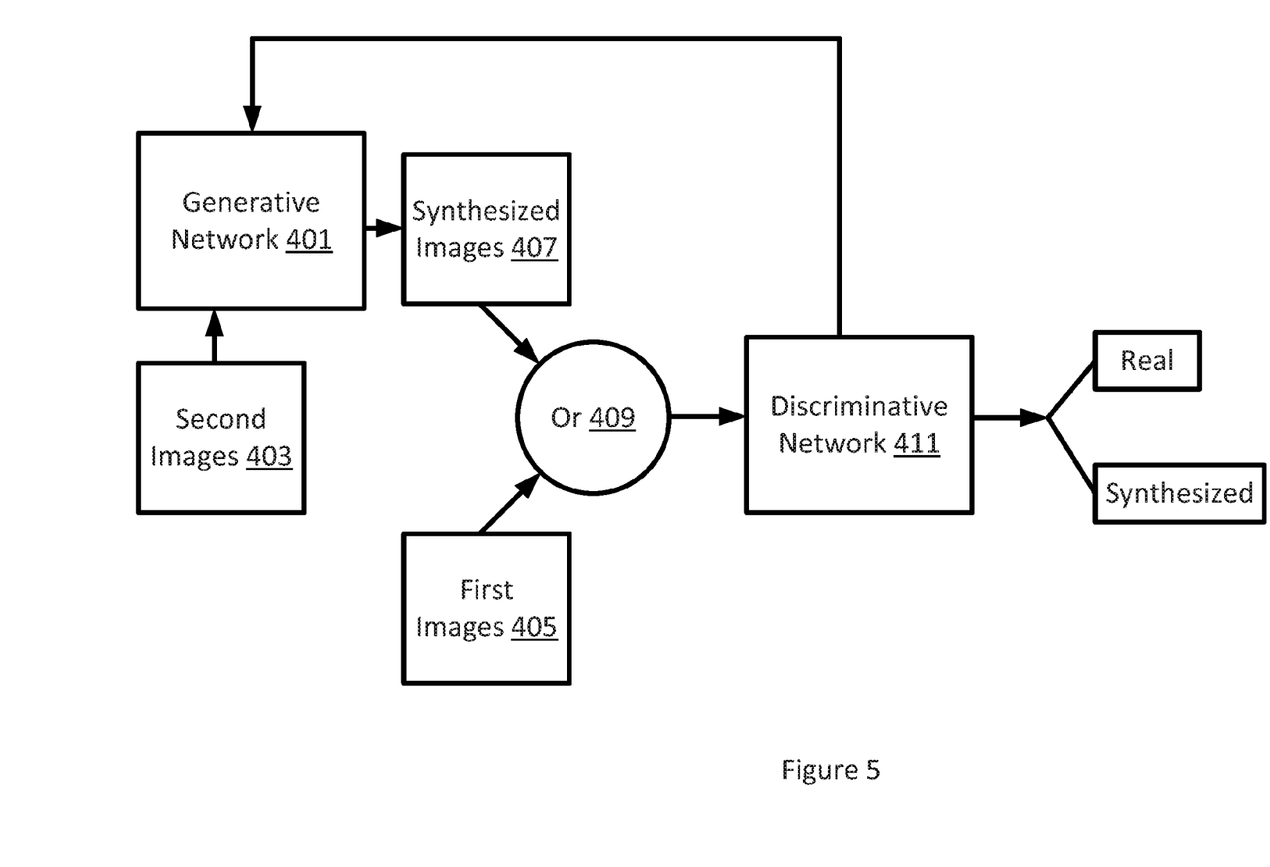
FIG. 5 depicts an example generative adversarial network process.

FIG. 5 depicts an example GAN process. The GAN process includes a generative network and a discriminative network 411. The inputs to the GAN process are first images 405 acquired from a first camera and second images 403 acquired from a second camera. The GAN process provides the training process as a contest between the two separate networks: the generative network 401 that generates synthesized images 407 and the discriminative network 411 that attempts to classify images as either real images 405 from the first camera or synthesized by the generative network 401 using an image 403 from the second camera. The OR function 409 randomly feeds the discriminative network 411 with either a synthesized image 407 or a first image 405. The discriminative network 411 identifies (or scores) which of the two sources the image is from.

When the discriminative network notices a difference between the two sources, the generative network 401 adjusts its parameters slightly. The information from the discriminative network is backpropagated to the generative network 401, so the generative network 401 knows whether or how to adapt its parameters in order to produce output data that may fool the discriminative network to attempt to limit the difference. At the end of training, the generative network 401 is able to synthesize an image from the second images 403 that includes color features that are similar to color features in the first images 405 from the first camera. During training, the discriminative network may be adjusted in order to get better at distinguishing the true images from generated images.

Referring back to FIG. 3, at act A130, one or more clouds are detected using the classifier. The fifth sky image or series of images output by the generative network 401 may be input into the classifier to determine which pixels represent clouds and which pixels represent clear sky. The classifier may be a machine learnt network that is trained to detect clouds in an image. The classifier may be trained to detect clouds using a series of images from a first camera. The classifier may be any type of machine learnt classifier. The classifier may be trained using annotated images. For example, an operator may manually annotate each image to identify which pixels in the image correspond to a cloud or clear sky pixel. The classifier may learn to identify pixels in an input image as corresponding to a cloud of clear sky pixel (or various levels of cloud coverage). The classifier may output a segmented image or images that includes information that outlines the clouds in the sky image. A percentage coverage or other measure of cloud coverage may be output. Another method for cloud detection includes computing the red-to-blue ratio (RBR) of the image color channels, that achieves a good degree of separation between clouds (high RBR) and clear sky pixels (low RBR). The classifier may be taught using the annotated images to identify in a new image from the first camera, which pixels represent clouds.

Other classifiers may be used to detect clouds. Support vector machines (SVMs, also support vector networks) may be used by the classifier to learn to classify the images. SVMs include supervised learning models with associated learning algorithms that analyze the image data used for classification and regression analysis. Given a set of training examples, each pixel or group of pixels marked as belonging to one or the other of two categories (e.g. cloud or clear sky), an SVM training algorithm builds a model that assigns new examples to one category or the other. A SVM model is a representation of the examples as points in space, mapped so that the examples of the separate categories are divided by a clear gap that is as wide as possible. New examples are then mapped into that same space and predicted to belong to a category based on which side of the gap the images fall.

Alternative modeling systems may be used to learn to classify the image data, such as deep learning though neural networks or generative models. Deep machine learning may use neural networks to analyze the images from the first camera to identify the shape or outline of the clouds. Neural networks may include a collection of interconnected processing nodes. The connections between the nodes may be dynamically weighted. Neural networks learn relationships through repeated exposure to data and adjustment of internal weights. Neural networks may capture nonlinearity and interactions among independent variables without pre-specification.

In certain embodiments, feedback may be provided from the analysis process to the training of the discriminative network 411 and the generative network 401. Ground truth data, for example, generated power, may be compared to predicted generated power. Differences may be attributable to errors in the cloud map forecasting. The errors in the cloud map forecasting may be used to adjust the analysis or training processes. Alternatively, or in addition, the analysis, e.g. segmentation, may be checked to identify differences between the segmentation process and a manual annotation. Errors that are attributable to the cloud coverage map may be used to improve the training process of the discriminative network 411 and the generative network 401. The discriminative network 411 and the generative network 401 may be trained and retrained on newly acquired images from both the first and second cameras.

While the above referenced example described a system for cloud forecasting, a generative adversarial network may be used to synthesize any image for analysis. Applications, for example may include automatically synthesizing images for use in film making or computer-generated image applications.

Figure 6:
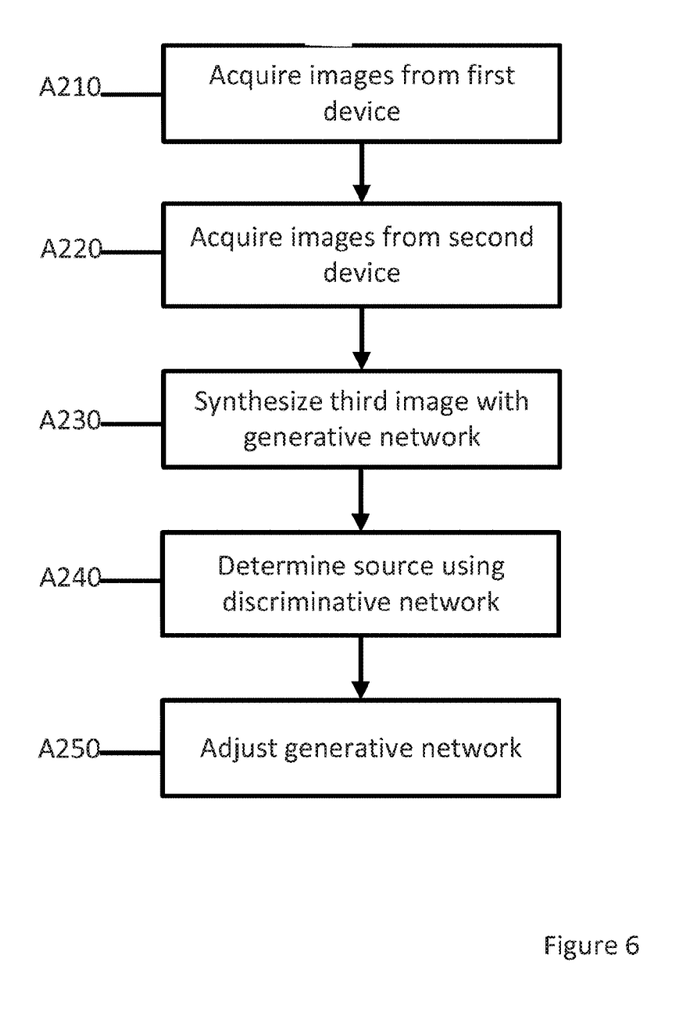
FIG. 6 depicts an embodiment of a method for training a generative network.

FIG. 6 depicts one embodiment of a method for training a generative network for synthesizing an image for analysis. The generative network 401 is trained to generate synthetic images from images acquired from a second device that are similar to images acquired from a first device. The acts are performed by the system of FIG. 7, other systems, a workstation, a computer, and/or a server. For example, act A210 and A220 may be performed by a camera. Act A230 and A240 may be performed by processor, such as a workstation, server, or a computer. The acts are performed in the order shown (e.g., top to bottom) or other orders.

At act A210, a plurality of first images are acquired from a first camera. At act A220 a plurality of second images are acquired from a second camera. Any types of cameras may be used. The cameras may be, for example, surveillance cameras. The cameras may be mobile or fixed in place. In an embodiment, the first and second images are color images. The first and second images may be acquired over periods of time and may represent different views. The first and second images are not paired, e.g. the first images are acquired at a different time, in a different period, and/or from a different location than the second images. The images may be acquired to train a neural network below in A230. Variations in the content of the images may be used to identify relationships between the color features.

In an embodiment, cameras are located at different locations. In an embodiment, in order to provide accurate cloud detection, the cameras may be spread over an area surrounding a site (e.g. power plant). Cameras may be setup at various distances around the site to provide images that cover a wide area. The fields of view of the cameras may overlap portions of the sky. Motion prediction and other algorithms may allow for a system to predict future cloud coverage based on current conditions. The cameras acquire images at set intervals. For example, an image may be acquired every second, every 5 seconds, every 8 seconds, every 10 seconds, every minute among other time intervals. The images acquired by the cameras may be transmitted to a central processing location. Alternatively, the images may be transmitting through a network to a cloud computing environment.

In an embodiment, the first camera and second camera are different models or manufactured by different manufacturers. In an example, the second camera may be a replacement camera that is a newer model of the camera that is replaced. The first camera or even a third camera not used of the facility may be the camera that the classifier has been trained on. For initial training of the classifier, many images are used to provide for accurate analysis of the cloud coverage. Repeating the collection and training for each new camera added to the system may be inefficient.

At act A230, a third image is synthesized by a generative network 401 from a second image of the second plurality of images. The generative network 401 may be any type of machine learning network, for example a neural network. In an embodiment, the generative network 401 receives an image from the second camera as input and generates a synthetic image from the image through a series of convolutional and deconvolutional layers. In an embodiment, the generative network 401 and discriminative network 411 are configured as an encoder decoder pair. In an embodiment, the generative network 401 is configured so that the adapted image content is the same as before the transformation. The shape, size, position etc. of the clouds is not explicitly changed or moved in order to maintain accurate cloud coverage prediction. To avoid changing the shape or position of the clouds, pixel information is not shifted, moved, or added resulting in different content. If the shape of the clouds was altered, the resulting output image, while possibly able to fool the discriminative network 411, would not provide accurate information to the forecasting system. However, the shape, size, and position may be changed inadvertently due to changes by the color filters. For example, if the color in a pixel is adjusted to be darker, the resulting segmentation may not identify that pixel as a cloud pixel anymore.

The generative network 401 changes the color content of a pixel or grouping of pixels, such as changing the relative weighting of red, green, and blue color components. The generative network 401 may use one or more filters to adjust color features of the input image. The filters may include adjusting color intensity, color inversion, brightness, contrast, saturation, color balance, among other filters. The filters may be applied on a pixel by pixel basis or to a group of pixels. In an embodiment, the filter operations of the generative network 401 are localized within each pixel or at most a restricted neighborhood (e.g. up to 5×5 for the overall effective receptive field). In an embodiment, the range of possible filters is limited so that the resulting image does not drastically affect the underlying content. For example, the filters may only be able to adjust slightly the color balance instead of drastic changes. The filters may be implemented as layers in the generative network 401.

At act A240, a discriminative network 411 determines how likely the synthesized third image was acquired by the second device or how likely the synthesized third image was synthesized using the generative network 401. The discriminative network 411 is configured to attempt to classify if an image is real or synthesized by the generative network 401. The discriminative network 411 is trained as a classifier to distinguish between the two sources. The discriminative network 411 may be a neural network or other machine trained network.

In an embodiment, a convolutional network structure is used for the discriminative network 411. The discriminative network 411 receives an input image, either a real image acquired from the first camera or a synthetic image synthesized by the generative network 401. The image is propagated through a plurality of convolutional layers with for example, the image dimension down and the channel dimension multiplied. Each convolutional layer is followed by rectifiers. The final layer returns a classification label of (0)

for a synthetic image or (1) for an image from the first camera. Instead of a binary classification label, the final layer (e.g., softmax layer) may return a classification score. For example, the score may include a range of 0 to 1 with scores closer to 0 indicating a synthetic image and scores closer to 1 indicating an image from the first camera.

At act A250, the generative network 401 is adjusted based on the determination. In addition to the discriminative network 411 preforming the classification, information may be backpropagated through both the discriminative network 411 and the generative network 401 to determine how to change the generative network's parameters better. The two networks contest one another, the discriminative network 411 attempts to distinguish images acquired with the first camera from the synthesized images and the generative network 401 attempts to synthesize images that make the discriminative network 411 think the synthesized images are from the first camera. At the end of training process, the generative network 401 outputs synthesized images that have color features that are indistinguishable from images from the first camera.

In the GAN process, the training of the discriminative network 411 may be done simultaneously with training the generative network 401. The training may be accomplished by performing small gradient steps in both generative network 401 and discriminative network 411 weights. In an embodiment, the discriminative network 411 may be locked while the generative network 401 is trained so as to lower the accuracy of the discriminative network 411. If the generative distribution is able to match the real data distribution perfectly, then the discriminative network 411 will be maximally confused, predicting real images for all inputs. In an embodiment, the discriminative network 411 is trained until optimal with respect to the current state of the generative network 401; then, the generative network 401 is again trained and updated. Alternatively, the training of the discriminative network 411 and generative network 401 are performed at separate learning rates. The discriminative network 411 might not be trained until optimal, but rather may only be trained for a small number of iterations, and the generative network 401 is updated simultaneously with the discriminative network 411.

One issue with GAN networks is that in order to arrive at an effectively trained generative network 401, the back and forward training of both the generative network 401 and discriminative network 411 needs to be trained so as not to overfit or cause failures. In one common failure mode, the discriminative network 411 overpowers the generative network 401, classifying generated images as fake with absolute certainty. When the discriminative network 411 responds with absolute certainty, there is no information that may be passed back to the generative network 401 to be adjusted with. In another common failure mode, mode collapse, the generative network 401 identifies and exploits a weakness in the discriminative network 411. The generative network 401 may begin to generate very similar images regardless of variation in the generative network 401 input. In the scenario, the discriminative network 411 is too easy to fool. Mode collapse may be corrected by strengthening the discriminative network 411, for example, by adjusting the discriminative network training rate.

In an embodiment, the training may be done using batches of images from the two cameras. The discriminative network 411 is able to look at an entire batch of images in order to decide whether the images come from the generative network 401 or the first camera. Batches also may provide a more specific algorithm that works by modelling the distance between a given image and all other images in the same batch. The distances may be combined with the original image and passed through the discriminative network 411. The discriminative network 411 may use the distance measures as well as the image values during classification.

In another embodiment, the training of the networks involves feature matching. Feature matching specifies a new objective for the generative network 401 that prevents the generative network 401 from overtraining on the discriminative network 411. Instead of directly maximizing the output of the discriminative network 411, the new objective requires the generative network 401 to generate data that matches the statistics of the real data. The discriminative network 411 specifies the statistics for matching. The generative network 401 is trained to match the expected value of the features on an intermediate layer of the discriminative network 411.

In another embodiment, the generative network 401 and discriminative network 411 may be adjusted manually based on manual annotation of the classification output by the discriminative network 411. For example, an operator that knows the source may manually adjust weights in the discriminative network 411 or may feed specific images into the discriminative network 411 to generate information to be backpropagated to the generative network 401.

Each of the different training mechanisms may incentivize the networks to identify the most salient features of images from the first camera. For example, the generative network 401 may learn that adjacent pixels are likely to have the same color, or that the clouds are not made up of horizontal or vertical edges, or are made up of blobs of different colors. Eventually, the networks may identify many more complex patterns: that there are certain types of backgrounds, objects, textures, that the patterns occur in certain likely arrangements.

Figure 7:
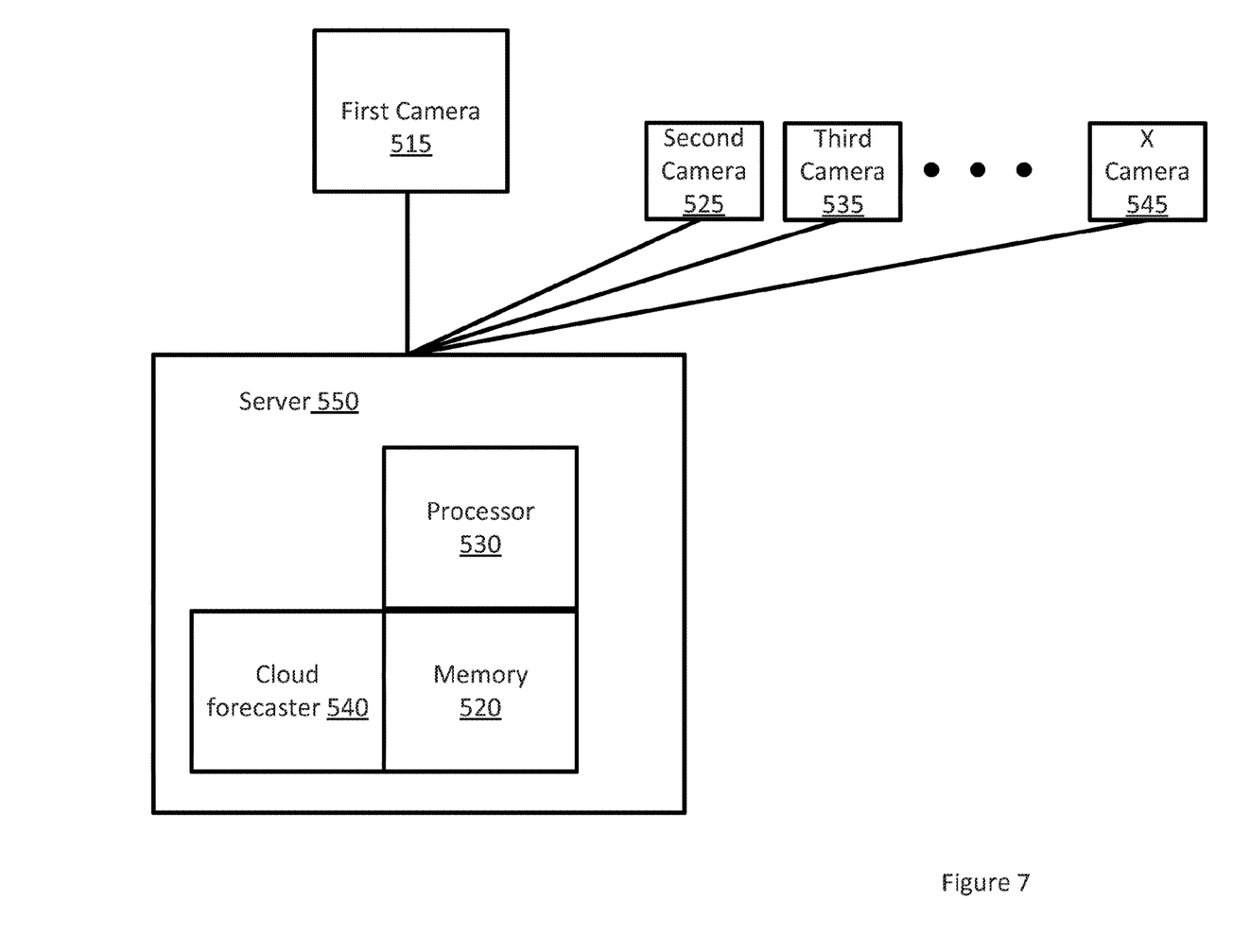
FIG. 7 depicts a system for adapting a sky image from one camera to be analyzed with a classifier trained on sky images from a second camera.

FIG. 7 depicts one embodiment of a system for color adaption using an adversarial machine-trained network. The system includes a plurality of cameras (First Camera 515, Second Camera 525, Third Camera 535, X Camera 545) and a server 550. The server 550 contains a processor 530, memory 520, and a cloud forecaster 540. Additional, different, or fewer components may be provided. For example, network connections or interfaces may be provided, such as for networking between the cameras and server. Other inputs to the cloud forecaster may be provided such as sensors for gathering weather data. A workstation with a user interface may be provided for an operator to input data.

In an embodiment, there are two cameras, e.g. first camera 515, second camera 525. In other embodiments, there are more than two cameras. The cameras 515, 525 may be setup at different locations to capture different images. In an embodiment, the cameras 515, 525 are fixed at one or more locations. Alternatively, one or more of the cameras 515, 525 may be mobile. The cloud forecaster 540 may include a classifier that is trained using images from the first camera 515. In order to provide similar images to the cloud forecaster for each of the cameras 525, 535, 545 without having to retrain the classifier, the images from Cameras 525, 535, 545 may be adapted to have similar color features as images of Camera 515. The adaptation is synthesized by the generative network 411.

The processor 530, memory 520, and cloud forecaster 540 are part of the server 550. Alternatively, the processor 530, memory 520, and/or cloud forecaster 540 are part of other devices, such as a power plant system, a hybrid power plant system, or power output controller system. In other embodiments, the processor 530, memory 520, and cloud forecaster 540 are a personal computer, such as desktop or laptop, a workstation, a server, a network, or combinations thereof.

The memory 520 may be a graphics processing memory, a video random access memory, a random-access memory, system memory, cache memory, hard drive, optical media, magnetic media, flash drive, buffer, database, combinations thereof, or other now known or later developed memory device for storing data or video information. The memory 520 is part of the server 550, part of a computer associated with the processor 530, part of a database, part of another system, a picture archival memory, or a standalone device. The memory 520 may store image data from one or more cameras. The memory 520 may store an instruction set or computer code configured to implement a GAN including a generative network 401 and when training, a discriminative network 411.

The GAN includes an instruction set or computer code for implementing a generative network 401 and/or a discriminative network 411. In an embodiment, the GAN only includes a trained generative network 401. Alternatively, for training, the GAN may include both the generative network 401 and discriminative network 411. The generative network 401 learns to capture the color features from one camera and transform the images into synthesized images that are indistinguishable in the color features from images acquired from another camera. In the training process, a discriminative network 411 scores how likely the synthesized images are similar to those from the second camera. Using the technique, the amount of data required to establish a reliable mapping between the two cameras is much less than other methods and the images are not required to be paired.

The generative network 401 is configured so that the adapted image content is the same as it was before the transformation. The shape, size, position etc. of the clouds may not be changed in order to maintain accurate cloud coverage prediction. The filter operations in the network may be localized within each pixel (e.g. pixel value scaling and offsetting) or at most a restricted neighborhood (e.g. 5×5 for the overall effective receptive field).

The memory 520 or other memory is alternatively or additionally a non-transitory computer readable storage medium storing data representing instructions executable by the programmed processor 530 for adapting color features of an image. The instructions for implementing the processes, methods and/or techniques discussed herein are provided on non-transitory computer-readable storage media or memories, such as a cache, buffer, RAM, removable media, hard drive, or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code, and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 530 is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device for adapting color features of an image. The processor 530 is a single device or multiple devices operating in serial, parallel, or separately. The processor 530 may be a main processor of a computer, such as a laptop or desktop computer, or may be a processor for handling some tasks in a larger system, such as in the imaging system 530. The processor 530 is configured by instructions, design, hardware, and/or software to perform the acts discussed herein.

The cloud forecaster 540 may be configured to predict cloud coverage for a time horizon up to 20 minutes or more. The cloud forecaster may include an image classifier that segments the clouds in the sky images. The basic features for such classifier are pixel colors. In order to generate an accurate segmentation, the input images to the cloud forecaster may have similar color features. The synthesized images from the generative network 401 include similar color features to images from a first camera. The classifier may only need to be trained using images from the first camera and may not be trained repeatedly when a camera is replaced, or a new camera is installed.

The cloud forecaster 540 may be a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device for forecasting clouds. The cloud forecaster may receive inputs from other sensors such as weather sensors.

The processor 530 and/or server 550 are configured to perform the acts discussed above for adapting images using adversarial training networks. The processor 530 and/or server 550 may access and implement the code stored in memory.

The server 550 connects to the cameras via a network. The network is a local area, wide area, enterprise, another network, or combinations thereof. In one embodiment, the network is, at least in part, the Internet. Using TCP/IP communications, the network provides for communication between the processor 530 and the server 550. Any format for communications may be used. In other embodiments, dedicated or direct communication is used.

The server 550 includes the processor 530 or group of processors. More than one server 550 may be provided. The server 550 is configured by hardware and/or software. In one embodiment, the server 550 performs machine learning of the GAN. The server 550 may acquire and the memory 520 may store data from multiple cameras.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A method for adapting a second sky image from a second camera to be classified with a classifier trained on a plurality of first sky images from a first camera, the method comprising:
   acquiring the second sky image from the second camera;
   synthesizing from the second sky image, using a generative network having been trained with generative adversarial training, a third sky image, the third sky image including one or more color features that are similar to one or more color features of the plurality of first sky images; and
   detecting one or more clouds in the third sky image using the classifier.

2. The method of claim 1, wherein training the generative network comprises:
   synthesizing, by the generative network, a fifth sky image from a fourth sky image acquired from the second camera;
   determining, using a discriminative network, how likely the synthesized fifth sky image was acquired by the first camera or how likely the synthesized fifth sky image was synthesized using the generative network; and
   adjusting the generative network as a function of the determination.

3. The method of claim 2, wherein the training further comprises:
   adjusting the discriminative network to make the determination more accurate.

4. The method of claim 2, wherein synthesizing the fifth sky image comprises:
   altering one or more color features of the fourth sky image on a pixel by pixel basis.

5. The method of claim 2, wherein determining is binary; wherein the two binary choices are that the synthesized fifth sky image was acquired by the second device or the synthesized fifth sky image was synthesized using the generative network.

6. The method of claim 2, wherein adjusting comprises:
   altering weights of one or more filters of the generative network.

7. The method of claim 1, wherein detecting comprises:
   segmenting the third sky image using a machine learnt classifier.

8. The method of claim 1, wherein the second sky image is not paired with any of the plurality of first sky images.

9. A system for adapting sky images the system comprising:
   a first camera configured to acquire first sky images;
   a second camera configure to acquire second sky images;
   a machine learnt generative network configured to generate synthesized images from the second sky images, the synthesized images including different color features than the second sky images; and
   a cloud forecaster configured to identify clouds in the synthesized images, the cloud forecaster further configured to predict cloud coverage for a location.

10. The system of claim 9, wherein the machine learnt generative network is trained using an adversarial network.

11. The system of claim 10, wherein the adversarial network comprises:
   the machine learnt generative network; and
   a machine learnt discriminative network configured to classify input images as either synthesized images or first sky images;
   wherein the machine learnt generative network is adjusted as a function of the classification.

12. The system of claim 9, wherein the cloud forecaster is configured to identify clouds using a machine learnt classifier.

13. The system of claim 12, wherein the machine learnt classifier is trained to segment sky images based on color features of the first sky images from the first camera.

* * * * *